US008156045B2

(12) United States Patent
Rebenack et al.

(10) Patent No.: US 8,156,045 B2
(45) Date of Patent: Apr. 10, 2012

(54) METHODS AND SYSTEMS FOR ASSOCIATING CUSTOMIZED ADVERTISING MATERIALS WITH BILLING STATEMENTS

(75) Inventors: Larry M. Rebenack, Boulder, CO (US); Larry C. Pollard, Littleton, CO (US)

(73) Assignee: Qwest Communications International Inc., Denver, CO (US)

( * ) Notice: Subject to any disclaimer, the term of this patent is extended or adjusted under 35 U.S.C. 154(b) by 2891 days.

(21) Appl. No.: 10/421,996

(22) Filed: Apr. 22, 2003

(65) Prior Publication Data
US 2004/0215559 A1 Oct. 28, 2004

(51) Int. Cl.
*G06Q 40/00* (2012.01)
(52) U.S. Cl. ........................................... 705/40
(58) Field of Classification Search ............... 705/35–40
See application file for complete search history.

(56) References Cited

U.S. PATENT DOCUMENTS

| | | | |
|---|---|---|---|
| 5,513,254 | A | 4/1996 | Markowitz |
| 5,655,089 | A | 8/1997 | Bucci |
| 5,659,481 | A | 8/1997 | Qutub et al. |
| 5,761,650 | A * | 6/1998 | Munsil et al. ............ 705/34 |
| 5,774,885 | A | 6/1998 | Delfer, III |
| 6,123,361 | A | 9/2000 | Cohen |
| 6,304,857 | B1 * | 10/2001 | Heindel et al. ............ 705/34 |
| 2001/0017932 | A1 * | 8/2001 | Chang ............ 382/100 |
| 2002/0033825 | A1 * | 3/2002 | Satake et al. ............ 345/473 |
| 2002/0055906 | A1 | 5/2002 | Katz et al. |
| 2002/0077891 | A1 | 6/2002 | Castle et al. |
| 2003/0023631 | A1 | 1/2003 | Castle |
| 2003/0196175 | A1 * | 10/2003 | Shea ............ 715/526 |
| 2004/0074321 | A1 * | 4/2004 | Beck ............ 73/865.8 |
| 2004/0204789 | A1 | 10/2004 | Provost et al. |
| 2004/0215508 | A1 | 10/2004 | Rebenack |
| 2004/0215559 | A1 | 10/2004 | Rebenack et al. |

OTHER PUBLICATIONS

CableData—"Building Your Business With Cabledata"—Affiliate Marketing Services—1993—20 pages.
CableData—Create a Bill-Set Up Kit—9 Pages.
CableData—"Build on what you have"—Affiliate Marketing Services—1993—15 Pages.
DST Output, Campaign Manager v2.7.5—User's Manual, 2002, 71 Pages.
DST Output of California, Quality Validation—Implementation Guide—Version 1.3, Mar. 31, 2004,26 Pages.
DST Systems Inc., Electronic Media Project—Electronic Statements—Phase 2, Jun. 7, 1999, 165 Pages.
DST System Inc., TA2000—Investor datafeed indicator—Final external distribution, May 7, 2001, 32 Pages. DST System Inc., TA2000—Participant Recordkeeping Internet—Electronic Periodic Statements, Jan. 22, 2001, 42 Pages.
Tribute, Andrew, et al., "*Nexpo '97, Part II: Editorial and Advertising Systems, Other Products*" Aug. 18, 1997, Seybold Report on Publishing Systems, V26, p. 7(25).
U.S. Appl. No. 09/641,617, filed Aug. 17, 2000, "*Document Delivery System with Automatically Adjusted Copy Inserts*".

\* cited by examiner

*Primary Examiner* — Thu-Thao Havan
*Assistant Examiner* — Jennifer Liu

(57) ABSTRACT

The present invention, therefore, provides systems and methods for overcoming certain deficiencies in the prior art. For example, in accordance with one embodiment of the invention, a system is provided for producing a customized advertising insert for a particular billing statement. The particular billing statement can be associated with a particular customer, and a system for producing the insert in accordance with embodiments of the invention can comprise an industrial printer adapted to produce at least one customized advertising insert from at least one customized advertising insert image. This system can further comprise a collating device configured to receive at least one customized advertising insert from the industrial printer. The collating device can further be configured to associate the at least one customized advertising insert with the particular billing statement. The customized advertising insert and a particular billing statement can each comprise a common identifier.

25 Claims, 6 Drawing Sheets

ACME TELEPHONE CORP.

*Advantages of ACME DSL Service:*

A. In your neighborhood, 52% of homes use ACME DSL, as compared to 12% using other high speed solutions.

B. ACME DSL is 15% less expensive than its nearest competitor.

C. Because you have home and business phone lines, you qualify for a package discount.

For more information about this offer, call our preferred customer line: (555) 555-1234

*Interested in DSL Service?*

Date: 1/1/00

Based on your location, the following classes of DSL service are available to you:

① Business Class
  - 1 Mbps (Symmetric Connection)
  - Static IP Address
  - $69.95 / Month ② Power User
  - 1 Mbps (Downstream Connection)
  - 256 kBps Upstream Connection
  - $49.95 / Month ③ Standard Package
  - 256 kBps Upstream Connection
  - 128 kBps Downstream Connection
  - $34.95 / Month For our preferred customers only: When you order DSL service via www.acmedsl.com, mention priority code XXXXX for a $50.00 discount on installation

FIG. 1B

ACME TELEPHONE CORP.

Bill to:
John Smith
800 Elm Street
Anyplace, USA 00000

Item Description:
Local telephone service    $25.00
Long distance service      $15.00
Operator Fees              $ 5.00
Taxes                      $ 2.50
                           -------
Total Due:             $47.50

Make check payable to ACME Telephone

Account Number: 000100X          Date: 1/1/00

FIG. 4

METHODS AND SYSTEMS FOR ASSOCIATING CUSTOMIZED ADVERTISING MATERIALS WITH BILLING STATEMENTS

CROSS-REFERENCES TO RELATED APPLICATIONS

This application is related to U.S. application Ser. No. 10/421,999, entitled "METHODS AND SYSTEMS FOR UTILIZING AVAILABLE SPACE ON BILLING STATEMENTS," filed concurrently herewith by Larry M. Rebenack and Larry C. Pollard, the entire disclosure of which is incorporated by reference for all purposes.

BACKGROUND OF THE INVENTION

The present invention relates to systems and methods for producing advertising inserts in general, and for producing customized advertising inserts in particular.

As a general matter, billing statements typically are generated en masse on a monthly or other periodic basis and sent to customers. These billing statements often have include a variety of different types of billing information, including lists of goods/services being invoices, total amounts due and other customer information such as name, address and the like. Unfortunately, this information leaves a significant amount of white space on a particular billing statement. In the past, this white space has been unusable and therefore has gone wasted.

In order to remedy the situation, some companies have taken to inserting a variety of promotional messages on their billing statements. Such promotional messages might, for example, might encourage the customer to purchase additional goods and/or services and might include customer relations information such as customer service telephone numbers, helpful hints, answers to frequently asked questions and, perhaps, some generic advertising attempts. In the past, however, such information has amount to little more than filler in a vain attempt to make use of what would otherwise would be wasted white space. Such information, moreover, generally would be relatively ineffective in conveying or inducing any customer activity with respect to purchasing additional goods/services from the company.

Moreover, to stimulate customer activity, companies in the past also have included advertising inserts with their billing statements. For example, a credit card issuer might include several stand alone advertising inserts with a credit card statement. These inserts might seek to induce the customer to purchase any of a variety of goods or services. In the past, such advertising insert were sent indiscriminately to a wide range of customers and therefore were relatively ineffective at generating customer interest in the advertised products and/or services.

What is needed, therefore, is a more efficient way to utilize white space on a billing statement to include effective advertising and other promotional messages with a given billing statement. It further would be useful if there were a way to produce customized advertising inserts that were directed to a particular customer. Perhaps such customized inserts could be easily correlated with a given billing statement.

BRIEF SUMMARY OF THE INVENTION

The present invention provides, inter alia, methods and systems for producing advertising insert pages and associating such pages with a particular billing statement. For example, in accordance with one embodiment of the invention, a system is provided for producing a customized advertising insert for a particular billing statement. The particular billing statement can be associated with a particular customer, and a system for producing the insert can comprise an industrial printer adapted to produce at least one customized advertising insert from at least one customized advertising insert image. Such a system can further comprise a collating device configured to receive at least one customized advertising insert from the industrial printer. The collating device can also be configured to associate the customized advertising insert with a particular billing statement. The customized advertising insert and the billing statement can each comprise a common identifier. In certain embodiments, the common identifier can be a bar code.

The system can further comprise a database adapted to store a plurality of customized promotional messages and at least one processor in communication with the industrial printer and the database. In accordance with certain embodiments, this system can include at least one computer readable medium in communication with the processor(s). The computer readable medium can have instructions executable by the processor(s) to select at least one of the plurality of customizable promotional messages. The computer readable medium can include further instructions to create one or more customized advertising insert images and the customized advertising insert images can comprise at least one of the plurality of customizable promotional messages. In some embodiments, the computer readable medium can include further instructions executable by the processor(s) to transmit the customized advertising insert images to the industrial printer for printing.

In some embodiments, the at least one processor can be incorporated within a computer in communication with the industrial printer. In still other embodiments, the at least one processor can be a plurality of processors comprising a first processor and a second processor. In such embodiments, the at least one computer readable medium can be a plurality of computer readable media. The plurality can comprise a first computer readable medium in communication with the first processor and a second computer readable medium in communication with the second processor.

In particular embodiments, the computer readable mediums can include instructions to divide the at least one customizable advertising insert image into a plurality of panels. At least one of these plurality of panels can include one or more customizable promotional messages. In other embodiments, the computer readable medium can include instructions executable by the processor to correlate the customized advertising insert image(s) with a promotional theme associated with the particular billing statement. In still other embodiments, the at least one customizable advertising insert image can include customer billing information for the particular customer. And the customer billing information can be associated with the billing statement.

In some embodiments, the instructions can be executable to calculate a projected weight of the at least one customized advertising insert. The calculated projected weight can be compared to a predetermined weight threshold and, if the projected weight is less than the predetermined weight threshold, an additional customized advertising insert image can be created. The at least one additional customized advertising insert image can include the common identifier and at least one additional customized promotional message.

In one aspect, the database can include demographic information about the particular customer and the computer readable medium can include instructions executable to customize the at least one customizable promotional message based upon the demographic information for the particular customer. In another aspect, the database can comprise a plurality of selection criteria for determining which of the plurality of customizable promotional messages should be included on the at least one customized advertising insert image. Thus, the computer readable medium can include instructions to filter the plurality of customizable promotional messages with at least one of the selection criteria prior to selecting a customizable promotional message. In certain embodiments, filtering the plurality of customizable promotional messages can include applying a selection criteria to the demographic information for the particular customer in order to determine a set of appropriate customizable promotion messages for that customer.

Other embodiments of the invention provide methods for producing customized advertising inserts. One such exemplary method can comprise storing in a database a plurality of customizable promotional messages, the method can further comprise selecting at least one of the plurality of customizable promotional messages and creating at least one customized advertising insert image which can include a common identifier as well as at least one customizable promotional message. In some cases, selecting at least one of the plurality of customizable promotional messages comprises analyzing the at least one customized advertising insert image to determine at least one dimension of an available white space and selecting a promotional message that is dimensionally appropriate for the available white space.

The method can further include transmitting the at least one customized advertising insert image to an industrial printer and/or producing at least one customized advertising insert from the customized advertising insert image. In some embodiments the method can include associating the at least one customized advertising insert with the particular billing statement. The particular billing statement can also include the common identifier. In other embodiments, the method can include correlating the at least one customizable advertising insert image with a promotional theme associated with a particular billing statement.

In some cases the method can include storing in the database demographic information about each of a plurality of customers. In such embodiments, the method can also include customizing the at least one customizable promotional message based on the demographic information for a particular customer. In other embodiments, the method can include storing in the database a plurality of selection criteria for determining which of the plurality of customizable promotional messages should be included on a customized advertising insert image. Thus, selecting at least one of the plurality of customizable promotional messages can include filtering the plurality of customizable message with at least one of the selection criteria. In one aspect, filtering the plurality of customizable promotional messages can include applying the selection criteria to the demographic information for the particular customer in order to determine a set of appropriate customizable promotional message for that customer.

In further embodiments, the method can include calculating a projected weight of the at least one customized advertising insert and/or comparing the calculated projected weight of the at least one customized advertising insert with a predetermined weight special. If the calculated projected weight of the at least one customized advertising insert is less than the predetermined threshold, the method can further include creating at least one additional advertising insert image which can include the common identifier as well as at least one additional customizable promotional message. In some case, the predetermined weight threshold can depend upon the weight of the billing statements.

BRIEF DESCRIPTION OF THE DRAWINGS

A further understanding of the nature and advantages of the present invention may be realized by reference to the figures which are described in remaining portions of the specification. In the figures, like reference numerals are used throughout several to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

FIG. 1B is an exemplary customized advertising insert that can be produced according to other embodiments of the invention.

FIG. 4 is an exemplary preliminary billing statement image that can be produced in accordance with some embodiments of the present invention.

DETAILED DESCRIPTION OF THE INVENTION

Figure 1A:
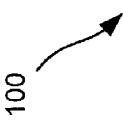
FIG. 1A is an exemplary billing statement that can be produced in accordance with some embodiments of the present invention.

Certain embodiments of the invention provide systems and methods for producing customized billing statements and/or customized advertising inserts for billing statements, which can be sent from a provider of goods/services to its customers (or, alternatively, to customers of one or more third parties). In accordance with some embodiments, a customized billing statement comprises billing information about a particular customer. Billing information can include, inter alia, the customer's name, address, account number and the like. Billing information can further include information about one or more transactions, including, for example, a list of goods/services provided, a total amount due, and/or payment terms.

In addition, a customized billing statement produced in accordance with embodiments of the invention can contain one or more customizable promotional messages. As used herein, the term "customizable promotional message" should be interpreted to include any sort of promotional, directed-advertising and/or customer-relations message, and can comprise any number of textual and/or graphical elements as well as, optionally, variable fields, such as those discussed in detail below. For instance, in some cases, a customizable promotional message can include a personalized message thanking a particular customer for her business. In other instances, a customizable promotional message can include one or more advertisements. In certain embodiments, one or more customizable promotional messages can be selected for inclusion on a billing statement and/or advertising insert from among a plurality of such messages, which can, as discussed below, be stored in a database.

In accordance with various embodiments, promotional messages can be considered customizable for a variety of reasons. In some aspects, promotional messages can be customizable because they contain one or more variable fields, which can be used, inter alia, to incorporate a customer's demographic information into a promotional message, as discussed below. In other cases, a particular promotional message might be considered customizable because it is selected and/or modified based on a particular customer's demographic profile. In still other cases, a promotional message might be considered customizable because it can be selected and/or sized to accommodate the particular dimensions of an available white space on a billing statement and/or an advertising insert.

As used herein, the term "white space" should be interpreted to mean any portion of a billing statement, advertising insert, etc. that is blank and/or onto which a promotional message and/or other text/graphics can be inserted. For instance, on a given billing statement, the billing information (e.g., billed items, customer information, and the like) may take up 75% of the area of the billing statement. The other 25%, however, can be considered white space and, until now, would have been wasted space. Embodiments of the invention, however, provide methods and systems for utilizing that white space to provide customized promotional messages and the like.

In some cases, customizable promotional messages can be modified to accommodate the requirements for a particular application. Merely by way of example, a selected promotional message might be too large to fit into a given white space on a particular billing statement. In accordance with particular embodiments, the promotional message can, if desired, be modified to fit into the white space. For example, by decreasing the font size of the text of the promotional message, decreasing the size of any images in the promotional message, cropping the borders of the promotional message and/or performing other resizing operations as appropriate, embodiments of the invention can allow a single promotional message to be used with a variety of white space dimensions and formats. Other methods of resizing promotional message could be used as well, including, for instance, reformatting the layout, margins, etc. of a particular promotional message; adding, removing and/or modifying borders; increasing and/or otherwise changing font size, typeface, and the like; centering and/or otherwise aligning the message, etc. Hence, allowing for the seamless integration of a promotional message into a given white space.

In addition to the dimensions of promotional messages, in certain embodiments, the promotional theme of a given promotional message can be modified as well. Thus, for example, color schemes, font conventions, layout, etc., of a given promotional message can be changed to accommodate the promotional theme of the billing statement and/or advertising insert into which the promotional message will be inserted. Likewise, promotional slogans, logos, taglines, etc. can be modified to accommodate a given promotional theme. As used herein, the term "promotional theme" should be interpreted to include any principle and/or methodology used to guide the selection, layout, format, etc. of a billing statement and/or advertising insert. A "promotional theme," therefore, can include attributes such as, for example, color palettes, references to certain goods/services, particular slogans, layout attributes, and/or any other features related to the substance and/or presentation of a given promotional message. Merely by way of example, therefore, for a given billing statement, a promotional theme might specify that promotional messages should be directed to goods/services related to a particular product line; the theme might further specify that promotional messages use a particular thought and that promotional messages directed to competitive advertising are preferred. Embodiments of the present invention, therefore, can apply the promotional theme to the selection, layout, and/or formatting of promotional messages to be included on a billing statement/advertising insert. In these and other ways, promotional messages in accordance with various embodiments of the invention can be modified to facilitate their use in a wide variety of configurations in billing statements, advertising inserts and the like.

Turning now to FIG. 1A, a customized billing statement 100 in accordance with various embodiments of the invention is presented. Billing statement 100 comprises panels 104a, 104b, each of which can contain a variety of different types of information, including, for example, provider logo 108, as well as customer billing information 112 (which can comprise, among other things, name and address information 112a as well as an account number 112b and the like). Billing statement 100 can further include billing information 116, which, in this example, can include line items for different services provided as well, perhaps, as a total amount due.

Billing statement 100 can further include one or more customizable promotional messages (e.g., 120, 124, 128, 132), as discussed above. For instance, exemplary promotional message 120 comprises a customizable image, the size and shape of which can be modified to accommodate a particular white space on billing statement 100. Similarly, promotional message 124 comprises a customizable image. Like message 120, message 124 includes both graphical and textual elements. Thus, both messages 120, 124 can, but do not need to, include text. Those skilled in then art will recognize that customizable images can comprise any of a variety of image formats, including JPEG images, GIF images, bitmap files, raster drawings, and the like. Certain embodiments of the invention are operable to convert these and other image formats into information that can be interpreted by an industrial printer.

In some cases, a promotional message will comprise both customized and static portions. For instance, promotional message 128 includes a customized portion 132, as well as a static portion 136. A customized portion of a promotional message can depend on and/or include demographic information from a customer, information received from another source, and the like. In a certain aspect, customized portions can include variable fields. On the other hand, static portions of promotional messages may be hard-coded and might not necessarily change from message to message. In this way, therefore, a customized portion can be thought of in a sense as a variable element while a static portion can be thought of as a constant element.

Merely by way of example, in some cases, the text of a customized portion of a promotional message might vary according to, for instance, a customer's demographic information. In this way and others, embodiments of the invention allow for personalized advertising to customers. In the illustrated embodiment, for example, customized portion 132 includes the first name of the customer. Thus, embodiments of the invention allow the incorporation of a customer's demographic information into textual and/or graphical portions of promotional messages. Other examples could include inserting a birthday message into a billing statement/advertising insert during the month of a customer's birthday and perhaps including special promotional offers, inserting a "thank you" message for a good payment history, and the like.

In other respects, however, the text of a customized portion may remain the same, while the formatting, layout and/or other attributes of the customized portion might change. For instance, in accordance with certain embodiments, if demographic studies show that men and women respond differently to different types of message formats, a promotional message inserted on a billing statement sent to a man might be formatted in a fashion to which men would be more receptive while, conversely, a promotional message inserted into a bill sent to a woman would be formatted in a manner more amenable to women. As another example, if a billing statement is sent to a customer whose demographic information indicates that the customer might have poor eyesight (e.g., the customer is in the later stages of life and/or the customer's demographic information indicates that the customer has in the past purchased vision related goods/services), the promotional message might be formatted to include larger fonts and less intricate images, in order to be more effective for a customer with poor eyesight.

In accordance with other embodiments, a promotional message can include a preferred entry point into a sales channel. For example, promotional message 140 includes a specialized telephone number 144 that can be used by the customer to dial directly to an operator familiar with the special promotion referenced by message 140. In this way, a promotional message not only can provide an expedited means for the customer to quickly and easily inquire about and/or purchase the advertised service, but it can also allow the provider to more efficiently route and/or track inquiries, sales, etc. related to a given promotional message. In accordance with other embodiments, a promotional message might also include a specialized electronic mail address, website, postal address, and/or promotional code allowing the customer to obtain goods/services in a more expeditious manner and/or on more favorable terms than the general population to name but a few.

Often billing statement 100 will include an identifier 148, which can be any type of mark, signal, etc. (whether or not visible to the naked eye) that can be read, scanned, and/or otherwise input into a computer and used to identify a particular billing statement, advertising insert, etc. For instance, in the illustrated embodiment, identifier 148 is a bar code. In other embodiments identifier 148 could be any of a variety of items including markings in visible, invisible and/or magnetic ink, computer readable text and the like. In some embodiments, the identifier can comprise an embedded microchip and/or can transmit identification via a wireless link, perhaps in response to interrogation by a collating device. As discussed in detail below, in accordance with some embodiments, identifier 148 can be placed onto multiple pages of a billing statement and/or onto advertising inserts associated with a particular billing statement, so such pages/inserts can be associated with one another quickly and easily.

Turning now to FIG. 1B, a customized advertising insert 150 is illustrated. Advertising insert 150 can comprise a plurality of panels 154a, 154b, each of which can comprise a variety of elements, including without limitation logos, billing information and/or other text, customizable promotional messages and the like. In accordance with various embodiments of the invention, customized advertising inserts can be used to provide additional advertising opportunities at a relatively low cost to the provider, because they can be included with a billing statement while incurring little or no marginal cost over the cost of the billing statement itself.

For instance, as discussed in detail below, in accordance with some embodiments of the invention, the projected weight of a particular billing statement can be calculated, and a customized advertising insert can be included with that billing statement. Thus, if the weight of particular billing statement is below the U.S. Postal Service's threshold for the next rate increase, additional customized advertising insert pages can be added up to and until the combined mailing reaches that rate threshold. For example, if the lowest postage rate is in effect for mailings weighing one ounce or less, and a particular billing statement weighs half an ounce, customized advertising inserts can be added in accordance with an embodiment of the invention until the mailing weighs a full ounce. In this way, as discussed below, embodiments of the invention can prevent wasted postage costs as well as allow for the inclusion of a maximum amount of advertising space for little to no marginal cost over the mailing cost for the billing statement itself.

In addition, like customized billing statements, customized advertising inserts can contain one or more targeted and/or customizable promotional messages, which can be more effective than the untargeted advertising inserts that generally have been included with billing statements in the past. For instance, in accordance with some embodiments, customized promotional messages (when, for instance, included on customized billing statements or advertising inserts) can include demographic information about a customer and/or be modified, based on demographic information about the customer as discussed above. In addition, the customers demographic information can be used to select which promotional messages will be included on a particular billing statement and/or advertising insert. In accordance with certain embodiments of the invention, one or more selection criteria can incorporate particular business rules to determine an appropriate subset of all available promotional messages. By way of example, one selection criterion could specify that, if a customer's credit history meets a certain requirement, that customer should receive a promotional message offering a product or a free trial basis. Alternatively, a business rule might specify that only customers whose residences/businesses have been pre-certified by a local telephone company as capable of receiving digital subscriber line ("DSL") service should receive promotional messages related to DSL service.

Referring again to FIG. 1B, the demographic information for the customer to whom advertising insert 150 is directed might indicate that the customer's telephone line is capable of receiving DSL service. Certain selection criteria, therefore, have filtered the available promotional messages to include and/or prioritize messages related to DSL service. Advertising insert 150, therefore, comprises promotional messages 158, 162, 166, 168, each of which happen to apply to DSL service. Those of skill in the art will recognize that many other selection criteria could be employed as well. For instance, if a particular customer's demographic information indicates that the customer has recently switched to the provider from a competitor for a particular product, a selection criterion might specify that promotional messages geared toward other services offered by that competitor should be preferred for billing statements and/or advertising inserts directed to that customer.

Other selection criteria can incorporate cooperative marketing opportunities. For instance, if a particular customer purchases a computer, a selection criterion could specify that promotional messages for computer-related goods and services, either from the computer manufacturer or another entity be included on the billing invoice. Likewise, if marketing research shows that customers often buy two products together, even if those products do not on their faces appear to be complementary products, a selection criteria can be established to advertise one of the products on each invoice for another of the products. Such criteria might be established automatically, based on individual and/or aggregate buying habits of consumers.

As noted above, in certain embodiments, promotional messages themselves can be modified in light of a customer's demographic information and/or in response to selection criteria. For instance, promotional message 158 has incorporated demographic information not only about a particular customer but about the customer's neighbors to provide a more persuasive sales presentation with comparative advertising. Furthermore, promotional message 158 incorporates information gained from other sources, including, perhaps, industry survey and/or competitive research, to indicate that the offered product is less expensive than a competing product. Finally, promotional message 158 has been modified because the customer routinely purchases multiple services from this provider to offer the customer a package discount. Thus, to illustrate certain features of the invention, each of the components of exemplary promotional message 158 has been modified to incorporate either demographic information about the customer (and/or the customer's neighbors) or other information about the offered service and/or competitive services. In these and other ways, embodiments of the invention can incorporate data mined from several different sources to produce the most effective targeted advertising opportunity.

One example of a data mining/warehousing technique that can be used in accordance with the present invention is the "information bus" model known to those skilled in the art, whereby a system in accordance with particular embodiments of the invention is part of an information flow between a plurality of connected systems. Such connected systems can all be maintained within a particular enterprise or can span multiple enterprises, allowing for information efficiently to be shared between entities. In one aspect, therefore, embodiments of the information can push and/or pull information to/from the information bus, allowing seamless integration with other systems, such as customer relations management systems, inventory management systems, billing systems, and the like. Using the information bus, information about availability of the provider's (and/or others) products, customer demographics and the like can easily be integrated and incorporated into promotional messages, billing statements, etc. In fact, in particular embodiments, some or all of the information used to create promotional billing statements and/or advertising inserts can be obtained through the information bus, and any information output from the system can be pushed onto the information bus.

Likewise, promotional message 162, in addition to offering a preferred entry point to the vendor's sales channel (as mentioned above) can be modified by reference to the customer's demographic information to provide a telephone number that corresponds to the customer's local calling area, among other things. Further, as illustrated by promotional message 166, in certain embodiments, promotional messages can be modified to offer particular goods/services and/or packages of goods/services based on demographic information about the customer and/or other information. For instance, certain business rules, when applied to a customer's demographic information, might indicate that some products are available and/or desirable to a particular customer, whereas they might not be available or desirable to another customer. Thus, a given promotional message can be configured to include only those products that are available and/or desirable to the customer to whom the message is directed. For instance, promotional message 166 includes offers for "business class" DSL service, "power user" DSL service and a standard package of DSL service. These offerings can be based both on the demographic information about the customer's telephone line and the rates of service it is capable of supporting, as well as the fact that the customer purchases both business and residential telephone service which indicates that the customer may be interested in one of several different classes of DSL service. Those skilled in the art can appreciate that, in accordance with other embodiments, different business rules can be applied to customer demographic information to modify promotional messages in a variety of ways, including but not limited to, those discussed herein.

In a certain aspect, customized promotional messages can be used to stimulate interest in particularly desirable customers, including the offering of incentives. Thus, for instance, promotional message 168 includes a discount offer if the customer chooses to purchase an offered service through a preferred point of entry into the sales channel. Advertising insert 150 also includes identifier 172 which, in the illustrated embodiment, is identical to identifier 148 illustrated on FIG. 1A. In this sense, therefore, billing statement 100 and advertising insert 150 can be thought of to include a "common identifier," such that they can easily be associated and/or correlated for inclusion in a common mailing.

Figure 2:
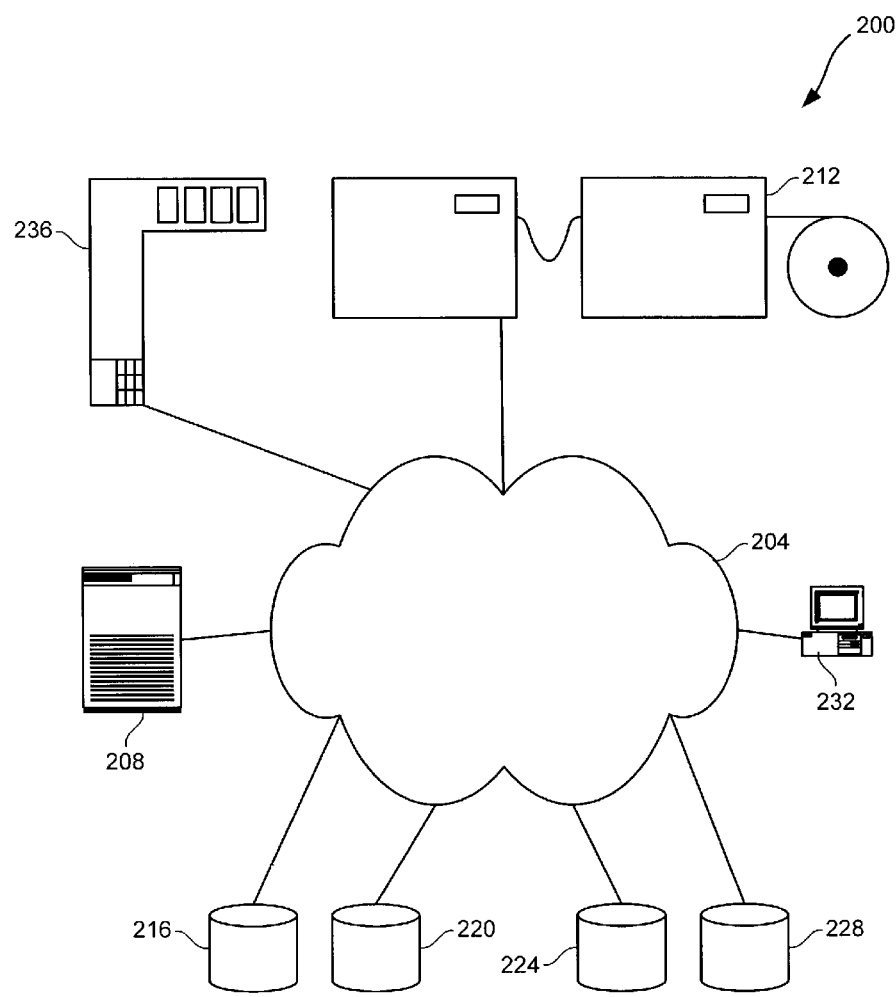
FIG. 2 is a network diagram illustrating an exemplary system in accordance with various embodiments of the invention.

Turning now to FIG. 2, a system 200 is illustrated for producing customized billing statements and/or customized advertising inserts in accordance with embodiments of the invention. System 200 can be implemented in a network environment (generally indicated by reference number 204). Network 204 can be any network capable of supporting communication between different computing devices. Merely by way of example, network 204 could be a local area network, an intra-network, the internet and/or any other telecommunications network, a wireless network and the like. Exemplary system 200 comprises a server computer 208 in communications with an industrial printer 212, perhaps through network 204. Server computer 208, although referred to herein as a "server," can, in fact, be any device that includes a processor and is capable of creating and/or formatting a customized billing statement/customizing advertising insert as indicated herein. Merely by way of example, server computer 208 can be a mainframe computer such as an IBM™ System/390™, a mid range system such as an IB™ AS/400™, and/or server running a UNIX™ or UNIX-like operating system (including, for example, AIX™, Solaris™, and/or Linux™). In other embodiments, server computer 208 can be a personal computer, perhaps running one of a variety of Microsoft™ operating systems, and/or can be an Apple™ computer. In a particular embodiment, server 208 can be one of the zSeries™ mainframe computers commercially available from IBM, including the Z900™ model.

Industrial printer 212 can be any printer that is capable of producing customized billing statements and/or customized advertising inserts. In some aspects, industrial printer 212 can be a high-speed printer capable of producing multiple billing statements/advertising inserts relatively quickly. Although the invention need not be limited to such printers, merely by way of example, in some cases industrial printer 212 can be a model 3090 continuous form printer commercially available from IBM™. In accordance with certain embodiments, industrial printer 212 can be capable of receiving and interpreting print commands in any of a variety of page definition languages known in the art, including, for example, the Postscript™, page definition language commercially available from Adobe Systems Inc.™, and/or the Advanced Function Presentation™ (AFP™) language commercially available from International Business Machines Corporation™. In certain embodiments, server computer 208 can perform all processing tasks, and printer 212, therefore, need only be capable of receiving a preformatted stream of print information and printing that preformatted stream. In particular embodiments, system 200 can, in some embodiments, comprise a plurality of processors. Each of the plurality of processors can perform one or more of the processing tasks discussed herein. Further, each of the plurality of processors can be in communication with one or more computer readable media, including, for instance disk drives, memory devices and the like which can include instructions executable by the processors to perform the functions discussed herein.

In accordance with various embodiments of the invention, system 200 can include one or more databases 216, 220, 224, 228, which can be used to store a variety of information related to the inventive methods discussed herein. Those skilled in the art will appreciate that although, for purposes of clarity, databases 216, 220, 224, 228 are illustrated separately on FIG. 2, other embodiments of the invention might incorporate all of the stored data within a single database and/or organize data structures differently than as illustrated herein. Moreover, in embodiments utilizing the information bus model discussed herein, the information discussed with respect to databases 216, 220, 224, 228 could be pushed and/or pulled from the bus, allowing for data acquisition from a wide variety of sources. The term "database," therefore, should be interpreted to mean a collection of information rather than read as a limitation to a particular physical or logical structure or organization. Databases 216, 220, 224, 228 can be in communication with server computer 208 either through network 204 (as illustrated on FIG. 2), through direct communication (e.g., SCSI connection, etc.) and/or through any other method known in the art, so long as server computer 208 can access the information stored within databases 216, 220, 224, 228.

For instance, database 216 can comprise plurality of customizable promotional messages. As discussed above, such promotional messages can be categorized within the database according to the products to which they pertain, the requirements for eligibility for a particular project, and/or with respect to any other appropriate categories. Merely by way of example, a database record for a given promotional message can include a field for storing the applicable dates for promotion offered in the message, such that the promotional message will only be inserted onto billing statements and/or advertising inserts during the date range specified in that field.

Further, as discussed above, customizable promotional messages can comprise any combination of text, graphics, predefined fields, for instance, into which a customer's demographic information, for instance, can be entered. A record in database 216 for a particular promotional message therefore may contain one or more fields that are capable of storing a graphic in any of the formats discussed herein (or, alternatively, a field specifying a link to another location where the desired image can be found), as well as fields for storing a variety of types of text known to those skilled in the art including, for example, strings, whole numbers, dates and the like. In this way, therefore, those skilled in the art will recognize that database 216 can easily be sorted and/or searched according to a variety of criteria, including criteria relating to any of these fields. In accordance with other embodiments, database 216 might store a customizable promotional message as a composite image comprising text, one or more graphics and/or predefined fields instead of storing each element as a separate field in the database record. The record can as well, therefore, include information about how to assemble a plurality of such elements to form the composite image (in one or more orientations and/or formats). Those skilled in the art will recognize that there are a variety of ways of storing composite information in a database, any of which can be implemented in accordance with various embodiments of the invention.

Database 220 can be used to store billing information for each of a plurality of customers. Often, therefore, database 220 can be incorporated within a software package (e.g., billing software, customer relations software etc.), and server 208 can be configured to interface with such software package in order to access the necessary customer billing information in database 220. Database 220 can also comprise information related to specific products offered by the provider and may be incorporated within an inventory management software package. In this way, database 220 can be accessed in accordance with certain embodiments of the invention to determine product availability which can be used in conjunction with certain selection criteria to include a promotional message for a particular product only if that product is currently available and/or in stock.

Those skilled in the art will recognize that there are a variety of ways in which server computer 208 might interface with database 220. As illustrated on FIG. 1A, billing information can include a variety of information including, merely by way of example, a customer's name, address, etc., an account number, as well as a list of items purchased and/or history, amount due for the current invoice, and amounts outstanding, payment terms and the like. In a particular aspect therefore, server 208 can access customer billing information in database 220 on a periodic basis (monthly, perhaps) and can retrieve billing information for any bills to be mailed to customers during that period. Alternatively, server 208 can access database 220 on demand. Various data access methods both standardized (e.g., OOBC, SQL, XML, etc.) and proprietary may be used to access databases 216, 220, 224, 228. Further, data may either be pushed from a database or "pulled" by server 208. As discussed below, server computer 208 can then create billing statements and/or advertising inserts as necessary based on the billing information.

Database 224 can comprise demographic information about a plurality of customers. Demographic information can include, in addition to any necessary billing information, information related to products and/or services the customer has purchased in the past, information related to the customer's purchasing habits in general, and information related to the customer's finances (including, but not limited to, credit rating, assets and/or debts, payment histories and the like); in some cases, a customer's demographic information can include information obtained from the customer's credit report, which can be accessed, inter alia, using the information bus described herein. In certain aspects, therefore, database 224 can include not only information related to the customer's history with the provider but also other information about the customer, which can be obtained from other sources, such as credit rating agencies, companies engaged in cooperative marketing efforts with the provider, market research agencies, commercial databases and the like.

In a sense database 224 (as well as databases 216, 220, 228) and/or server 208 can engage in a practice known in the art as "push-pull" data warehousing, whereby information (including, as in this example, a customer's demographic information) can be shared with and/or pulled from another source. Such data warehousing can be done within an enterprise or between multiple enterprises and can be performed using any of a variety of methods known to those skilled in the art including, merely by way of example, XML data transfers. In these and other ways, embodiments of the present invention, as discussed above, can interface with an information bus operation on an intra-company or inter-company basis, and can both pull information from that bus and push information (such as, for instance, the promotional information discussed below) to the information bus. Thus, systems in accordance with embodiments of the invention can easily integrate with other data management systems in the provider's network, for example by utilizing the information bus methodology described briefly herein and known to those skilled in the art.

Database 228 can comprise one or more selection criteria, which can be used to determine which promotional messages are candidates for inclusion on a given billing statement and/or advertising insert. Database 228 can also provide for associations between particular selection criteria, allowing such criteria to be grouped into sets (for example, to allow sophisticated filters to be pre-configured using several selection criteria). Selection criteria can also be used to determine the behavior and/or configuration of a particular promotional message on a given statement insert. Merely by way of example, as discussed above, selection criteria often incorporate business rules specifying when a particular promotional message is appropriate for a particular customer. For instance, therefore, if a customer has indicated in the past a lack of interest in a particular product, that lack of interest could be included in the customer's demographic information in database 224, and a selection criterion in database 228 could specify that, for any customer with an exhibited lack of interest in a given product, no promotional message relating to that particular product should be included on a billing statement. Alternatively, if a customer has expressed an interest in (but, perhaps, has not purchased) a particular product in the past, a selection criterion could specify that additional promotional messages be targeted toward that customer and/or could specify that additional incentives be offered in promotional messages related to the particular product (and/or complementary products) in order to induce the customer into purchasing the desired product.

Hence, embodiments of the invention can be used iteratively to market certain products to certain customers and, optionally, to gather information (either individualized or aggregate) about consumer purchasing habits. For instance, a series of promotional messages could offer different products to the same customer or similar customers at different price points (either simultaneously to several customers or to one or more customers over a period of time). For instance, a product could be marketed at a certain price in one monthly billing statement and, if an unsatisfactory number of customers responded, the price could be lowered the following month. If desired, the process could be continued until a satisfactory ratio of responses to product price has been reached.

Other selection criteria could include rules specifying that server 208 should check the availability of any offered product, perhaps in database 220 and/or a separate product database (e.g., by polling an information bus) before using a particular promotional message related to that product. In still other embodiments, selection criteria can employ rules specifying the frequency in which a particular promotional message or set of promotional messages should be included on billing statements/advertising inserts. For instance, a selection criterion might specify that a particular promotional message should be sent to a customer a maximum of four times, at which point the promotional message should be sent no more. Alternatively, selection criteria could specify that a promotional message be sent to a particular customer no more than three times per year. Still other selection criteria might specify that customers who already receive a particular product should not receive any promotional messages related to that product.

Thus, for instance, with respect to the example of DSL service, a customer who already receives DSL service from a particular telecommunications provider might receive no promotional messages for DSL service itself, but selection criteria might specify that that customer receive promotional messages for services related to DSL service, including, e.g., offers for DSL modems at reduced prices. Alternatively, incentives could be offered to induce a customer to upgrade to a more expensive class of service, perhaps by reference to the customer historical usage (e.g., noting that a heavy user might benefit from additional bandwidth), etc. Similarly, if the customer's demographic information shows that the customer has switched to the DSL provider from a different broadband Internet access provider, the selection criteria might specify that the customer receive promotional messages relating to switching to that provider for other telecommunications services and might specify the inclusion in the message of incentives for switching. In these and other ways, therefore, selection criteria can be stored in database 228 and can be used to define the promotional messages that a particular customer will see, as well as to adjust the nature of those promotional messages.

Any given criterion can be applied in different circumstances and, as mentioned above, criteria can be organized into sets. For instance, a particular selection criterion can apply only to a particular product line. Other selection criterion might apply only to a particular customer or set of customers. Some selection criterion may expire on certain dates and/or may be modified over time. These modifications can be automatic; for instance, pricing provisions for particular products might change automatically. Alternatively, a selection criterion can be modified by a user.

For instance, in accordance with some embodiments, system 200 can include a computing device 232 that can be in communication with server 208 and/or printer 212 and that can be used, inter alia, to provide configuration and operational instructions to either server 208 or printer 212. Computing device 232 can be any device known in the art that is capable of communicating with server 208 and/or printer 212, including, for example, a personal computer (perhaps running a Microsoft™ and/or Apple™ operating system), a personal digital assistant, a mini-computer, a workstation, a cell phone, and/or the like. Communication with server 208 and/or printer 212 can be through network 204 as illustrated on FIG. 2, or alternatively, can be through some other means of communication including wireless communication, direct connection and the like. Device 232 can be used, inter alia, to add, delete and/or modify any of the information contained within databases 216, 222, 224, 228. For instance, device 232 can be used to configure selection criteria with respect to a particular customer or product line. Moreover, while, in many circumstances, databases 216, 222, 224, 228 will be populated automatically, perhaps via an information bus or through the activities of other software applications (e.g., billing applications, inventory management applications and the like).

System 200 can include a collating device 236, which can be used to associate multiple pages of a particular customized billing statement and/or multiple customized advertising inserts. In this way, multiple pages that are directed to the same consumer can be incorporated in the same mailing in order to minimize postage and other administrative costs. Collating device 236 can be any device that is capable of sorting and/or organizing different pages into subsets. In a particular embodiment, collating device 236 can be one of the many inserters commercially available from Pitney Bowes™, including, merely by way of example, the 8 Series™ inserter. Collating device 236 optionally may include a facility for identifying pages/inserts (e.g., scanning device, a wireless transceiver, etc.). For instance, in some embodiments, collating device 236 includes a bar code reader than can be capable of reading a bar code from a customized billing statement and/or advertising insert. In this way, collating device 236 can receive a variety of unrelated pages and can easily and automatically sort those pages according to the identifier that is printed or otherwise displaced on those pages.

Figure 3:
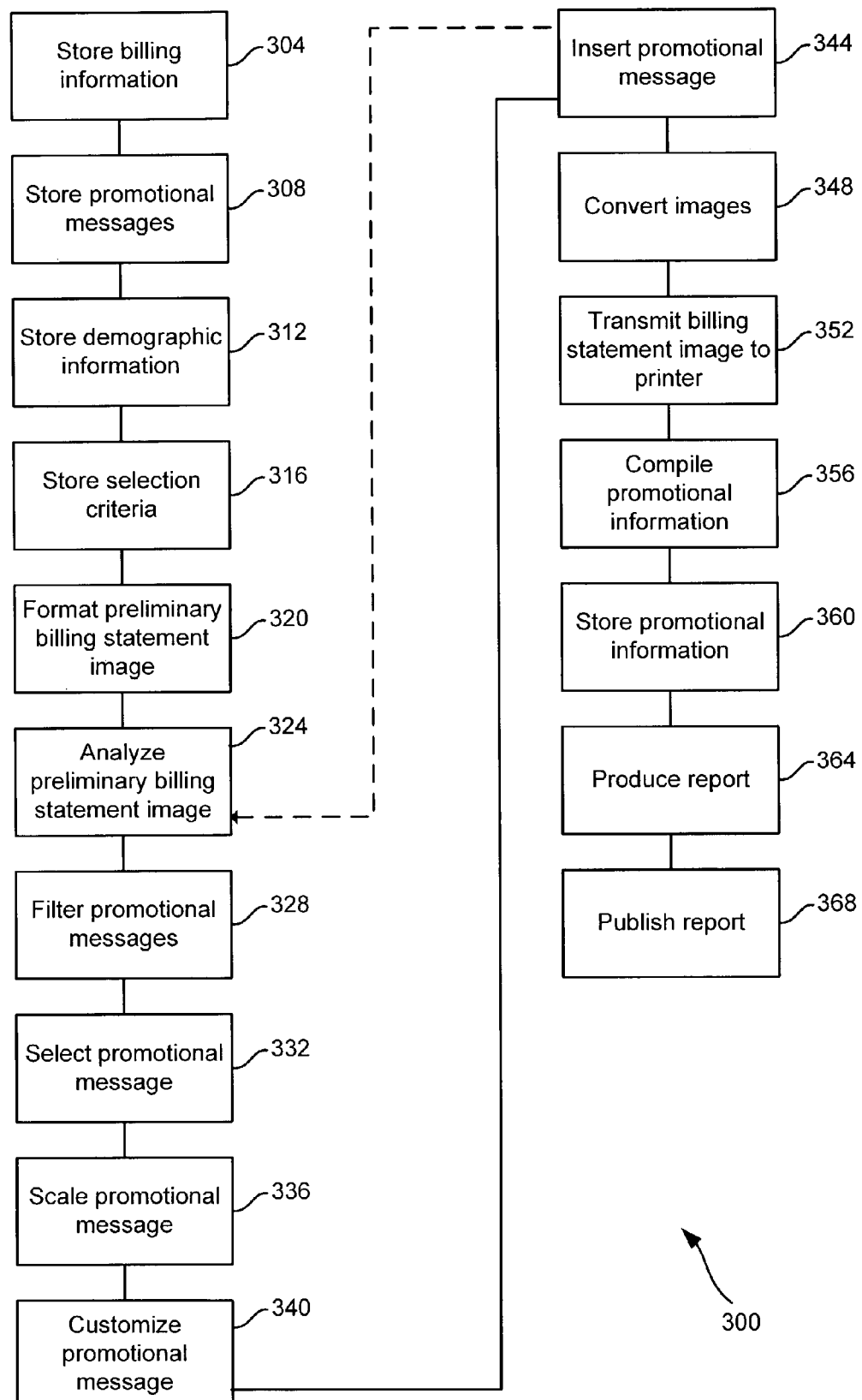
FIG. 3 is a flow diagram illustrating a method for producing a customized billing statement in accordance with various embodiments of the invention.

Turning now to FIG. 3, a method 300 is illustrated is for producing customized billing statements and/or advertising inserts in accordance with various embodiments of the invention. Although for ease of description, method 300 will be described by reference to system 200, those skilled in the art will ascertain that methods in accordance with various embodiments of the invention are not limited to any particular hardware or physical structure(s). In accordance with exemplary method 300, billing information for one or more customers is stored at block 304. As discussed above, billing information can be stored in database 220 and can include a variety of information about a customer and/or that customer's previous relationship and/or transactions with a company. At block 308 one or more customizable promotional messages can be stored (perhaps in database 216) the details of which are also discussed above. Likewise, at block 312, demographic information for one or more customers can be stored in database 224. At block 316, one or more selection criteria can be stored perhaps in database 228.

At block 320, a preliminary billing statement image can be formatted by one or more processors (e.g., those included in server 208). As used herein, the term "billing statement image" refers to a representation or description of a billing statement that can be transmitted to an output device (e.g., printer 212), and perhaps comprises a set of commands in a print definition language, as described above. Generally, a "preliminary" billing statement image can include any information necessary to bill the customer, including, by way of example, customer name and address, description of items to which the bill relates, total due, etc. For instance, FIG. 4 illustrates an exemplary preliminary billing statement 400 that comprises billing information 112a, 112b, 116 similar to customized billing statement 100 illustrated on FIG. 1A. Exemplary preliminary statement image 400, however, contains no customized promotional messages. Instead, it contains white space 404, 408. Thus, in a certain sense, a preliminary billing statement image can be thought of as a representation of a billing statement without any customized promotional messages included.

Returning now to FIG. 3, at block 324 the preliminary billing statement image is analyzed to determine any available white space. In one aspect, analysis of the preliminary billing statement image can include analyzing the dimensions and/or locations of any available white space as well, perhaps, as any other constraints on that white space (such as margins, as formatting requirements and the like). As a simple example, in accordance with certain embodiments, analyzing the image can include determining the location of a page break in the image. Page (and/or panel) breaks often will be inserted in a billing statement image in order to maintain the proper format for billing information (e.g., to separate different shipments, etc. on different pages) and/or to aid in customer interpretation of the bill (e.g., listing local telephone service charges and long distance charges on different pages, etc.). After the location of a page break has been determined, a software application can determine how much space (in points, inches, etc.) remains between the last piece of billing information and the page/panel break. As well, the software can determine, for any given white space, how much horizontal space (in points, inches, etc.) remains between any billing information and the edge of a page/panel and/or how much vertical/horizontal space is available between any two or more elements (text, etc.) on a billing statement. At that point, the software can record the size of that particular white space and set an anchor point at the beginning of the white space.

After the preliminary billing statement image has been analyzed to determine one or more blocks of available white space, at block 328 the promotional messages can be filtered, perhaps using selection criteria as discussed above. For instance, the complete set of promotional messages stored in database 216 can be filtered by one or more selection criteria in order to eliminate any promotional messages that might be inappropriate for the particular billing statement/advertising insert. A primary selection criterion often will be the size of the promotional message, in order that the message complies with the dimensional requirements of the selected white space. Other exemplary selection criteria are described elsewhere in this disclosure. After the promotional messages have been filtered (e.g., with the selection criteria), a promotional message can be selected at block 332. Selection of a promotional message can involve searching through all appropriate (e.g., filtered) promotional messages to find a promotional message that meets the selection criteria. Often, the chosen selection criteria will specify an ranking system for filtered messages (based, for example, on obtaining a certain distribution of messages using a rotation of messages, on promoting abundant products more aggressively than currently sold-out products, and/or on prioritizing messages that a particular customer has not yet seen or has seen infrequently), and selecting a message can comprise merely selecting the highest-ranked message from among those filtered as appropriate for the given white space. In other embodiments, the selection procedure illustrated by block 332 might be random, such that any appropriate message might be chosen. In still other embodiments, the selection procedure can include selecting a package of related/associated messages for insertion into one or more white spaces, for instance, in furtherance with a given promotional theme.

In accordance with certain embodiments, therefore, database 216 may include definitional information associated with each of the promotional messages, either implicitly or explicitly. For instance, in particular embodiments a horizontal (X) and a vertical (Y) dimension can be stored as one or more fields for each record in database 216. Such dimensions can be in inches, millimeters, points, pixels, etc. In other embodiments, promotional messages may be assumed to be a full page and/or a full panel (or any appropriate subdivision thereof, such as a half-panel, etc.) in width, and, hence, only vertical dimensions might be stored. In still other embodiments, promotional messages may be assumed to be a full page and/or panel (or, again, any appropriate subdivision thereof) in height and only horizontal dimensions will be stored.

Further, there may be a standard set of dimensions such that promotional messages can be coded in a way that their dimensions are ascertainable. Thus, for instance, a quarter panel message might be labeled and/or described in a certain way while a half panel message might be labeled and/or described in another way. Other labeling/description schemes could be used to identify preferred orientation and/or positions for a particular message. For instance, a particular message could be characterized as one-half panel wide and one-quarter panel tall, with a preferred position being the center of the top portion of a panel. These and other schemes for tracking the dimensional attributes of promotional messages can be employed within various embodiments of the invention. Thus, in accordance with certain embodiments, the filtering process (block 328) might not incorporate any criteria related to the dimensions of the messages, and the selection process (block 332) can involve searching database 216 for all promotional message (and/or all filtered promotional messages) that meet certain the dimensional requirements.

Given the disclosure herein, those skilled in the are will recognize that not every embodiment requires a promotional message to meet strict dimensional requirements for inclusion in a particular white space because promotional messages can be resized. In block 336, for instance, the selected promotional message(s) optionally can be scaled and/or resized to meet the dimensional requirements of a particular white space. Resizing the promotional message can comprise one or more of many operations including those mentioned above, such as scaling, cropping and the like. In particular embodiments, database 216 can store information for each promotional message regarding its amenability to resizing. For instance, if a given promotional message has certain dimensions but those dimensions contain a border that can be cropped, database 216 can store information about the recommended minimum size of a cropped version of that promotional message as well, perhaps, as which of the borders can be cropped and/or priorities for cropping one border before adjusting another, etc. Such minimums can, in certain embodiments, be strict limitations or, in other embodiments, can be considered guidelines, which can be explicitly overridden. In other embodiments, database 216 does not contain such resizing characteristics and software algorithms can be used to determine preferable methods of resizing. In a particular aspect, certain promotional messages may be marked, perhaps in database 216, as non-resizable (i.e., the promotional message must be inserted into a white space dimensioned exactly as it is stored in database 216). In these and other cases, resizing the promotional message can include adding characters, borders, etc. to ensure that a particular promotional message is centered in a white space and/or otherwise properly aligned. Optionally, the layout of the billing information, etc. on a preliminary billing statement image can be changed to create white space more amenable to a particular promotional message. For instance text, margins, etc. can be moved to generate additional white space and/or reshape existing white space.

At block 340, the promotional message can be customized if necessary. As discussed in detail above, customization can include the insertion of certain demographic (and/or other) information into the promotional message and/or adjustments to the text, image(s) and/or formatting of the promotional message to account for demographic information and/or promotional themes. At block 344, the promotional message can be inserted into the white space. A representation of the selected promotional message, including any optional resizing or customization, can be placed into the preliminary billing statement image, for instance at the anchor point determined in block 324. At this point, if there are other white spaces to be filled on a particular billing statement image/advertising insert image, the process of analyzing the white space (block 324), filtering promotional message (block 328), selecting promotional messages (block 332), resizing promotional messages (block 336), and customizing promotional messages (block 340) can be repeated until all desired white spaces on a given billing statement have been filled. Those skilled in the art will recognize, moreover, than any of the procedures discussed herein can be consolidated for multiple white spaces, so that, for instance, all of the white spaces on a page are analyzed at once before proceeding to filtering/selecting any promotional messages. Optionally certain white space can be left open; not all white spaces need to be filled.

At block 348, any graphic images, text, etc. on a particular billing statement image can be converted into the proper commands for an appropriate print definition language, if necessary. In some cases, image conversion can be considered optional as the images can be inserted in their native format into a billing statement image. In such cases, industrial printer 212 can include all necessary software, firmware, and/or hardware for image processing/conversion. In other instances, however, images may need to be converted into a page definition language that can be interpreted by the printer prior to sending the billing statement image/advertising insert image to the printer. Those skilled in the art will recognize that there are several commercially available image conversion software packages that can be implemented within the scope of various embodiments of the invention.

At block 352, billing statement images/advertising insert images can be transmitted to printer 212 for output. Such transmission can occur perhaps over network 204 and/or through a direct connection between server 208 and printer 212. Those skilled in the art will recognize that many forms of data transfer can be incorporate to accomplish the transmission of the images to printer 212.

In accordance with some embodiments of the invention, promotional information about billing statements and/or advertising inserts can be collected and/or tracked. Merely by way of example, software running on server 208 and/or device 232 can monitor for each billing statement/advertising insert (and/or a subset of all statements/inserts) how many promotional message were included, what type of promotional messages were included, and/or what customization/resizing of particular promotional messages took place. This information in general can be considered "promotional information". Promotional information can further include information about customer responses to one or more particular promotional messages. Merely by way of example, if a promotional message includes a preferred entry point into a sales channel, such that responses to a particular promotional message can be tracked, promotional information can include data regarding the number of customers responding (e.g., raw numbers of customers and/or percentages of customers) to a particular promotional message. Promotional information can further include, for example, the type of response (e.g., positive, negative, purchased product, inquired about more information, etc.) as well perhaps as the timing of the response (e.g., how long after the promotional message was mailed did the customer respond) and any other information that might aid in the analysis of the efficacy of a particular promotional message. In accordance with certain embodiments, therefore, promotional information can be stored, perhaps in one of databases 216, 220, 224, 228 (block 360) and/or transmitted to another system (e.g., via an information bus). Promotional information can be stored and/or tracked on an individual (e.g., per customer and/or per message) and/or aggregate basis. Promotional information can also be pushed/pulled to/from an informational bus, as described elsewhere in this disclosure. In certain cases, stored and/or transmitted promotional information can be used to logically link a particular billing statement and/or advertising insert with other statements/inserts in an archive, so that, for instance, an historical record of statements/inserts can be searched (e.g., to find a history of all statements and/or inserts sent to a particular customer over a period of time).

Optionally, reports can be produced (block 364) from the compiled promotional information. In this way, aggregate data can be viewed and analyzed. For instance, a report can detail the number of times a particular promotional message was sent to customers over a given time period (optionally categorized by customer type, business unit, etc.), the number of customers who responded to that promotional message, the different types of responses those customers exhibited and perhaps the overall efficiency of a promotional message which could include, for example, the number and type of responses as a function of the size, color, etc. of the message. Reports can also detail any customization and/or resizing of selected promotional messages, and can correlate consumer responses with modifications to the messages. In this way, for instance, the provider can analyze the efficacy of adding demographic information to a particular promotional message.

Those skilled in the art will appreciate that a wide variety of reports can be produced that can allow for sophisticated tracking and analysis of the effectiveness of particular promotional messages and/or groups of promotional messages. Such reports can provide many benefits and insights into the marketing process. For instance, if a series of promotional messages are sent to one or more customers based on different business rules, such that the promotional messages cover a range of different offer prices, a particular report can detail the ratio of responses to messages at each offer price, thereby allowing the provider to determine the most effective balance between number of responses and product price. In some embodiments, reports can be published (block 368). In accordance with certain embodiments, reports can be pushed/pulled from the application in accordance with the information bus methodology described above. In one aspect, reports can be published in a format such as HTML, XML, etc. that can be read by a web browser, allowing for easy and convenient viewing by large numbers of people, either within or without the provider's organization.

Figure 5:
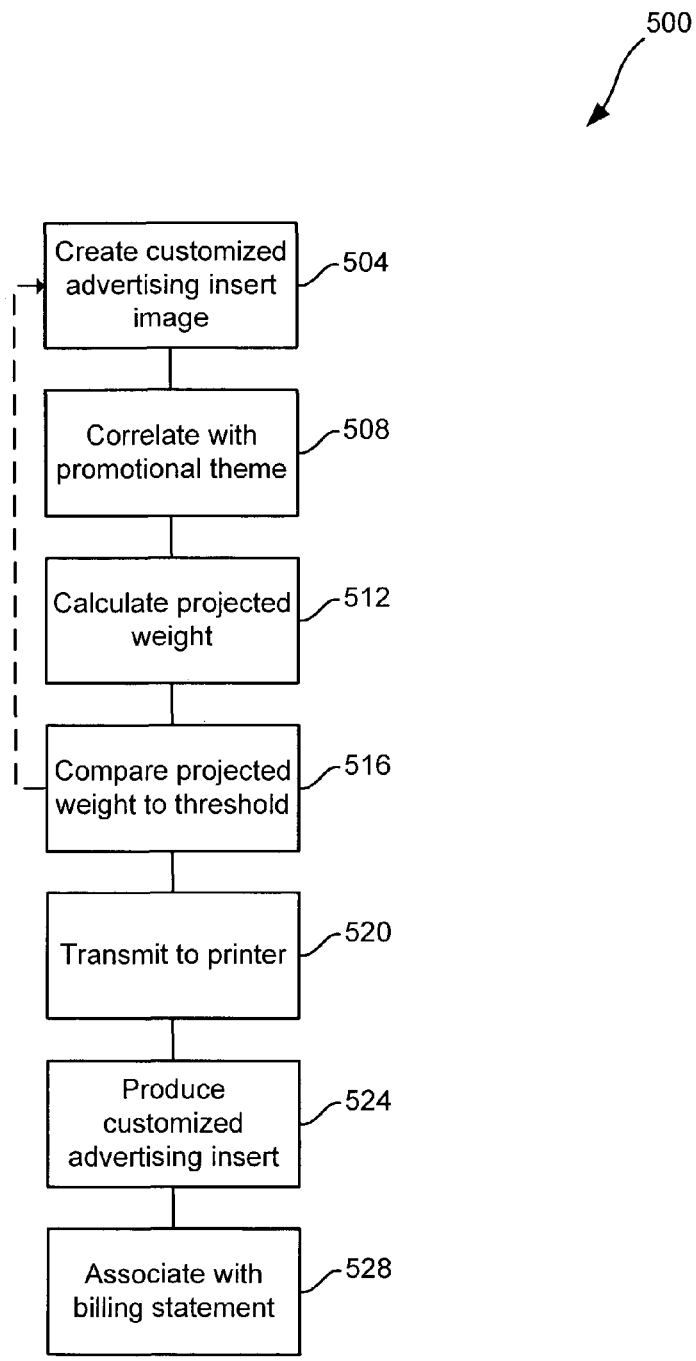
FIG. 5 is a flow diagram illustrating a method for creating a customized advertising insert in accordance with various embodiments of the invention.

Turning now to FIG. 5, an exemplary method is illustrated for the creation of one or more customized advertising inserts and/or the association of an advertising insert with a given billing statement. (Embodiments utilizing some or all of the procedures of FIG. 5 can also be used to create additional pages for multi-page billing statements, etc.) At block 504, a customized advertising insert image can be created. An "advertising insert" can be interpreted to mean advertising materials that can, in some cases, be included with a billing statement. Often, such advertising inserts can be formatted and/or printed by systems in accordance with certain embodiments of the invention, although some or all of a particular insert might include pre-printed text, graphics, etc. Advertising inserts can comprise one or more pages, although in some cases, each page of advertising materials can be considered a separate insert. Similar to the terminology used above with respect to billing statements, the "advertising insert image" refers to a representation or description of an advertising insert, which can be transmitted to an output device (e.g., printer 212) to produce an advertising insert; hence, an advertising insert image can, in some cases, comprise a set of commands in a print definition language, as described above.

In general, the creation of a customized advertising insert image can follow the procedures detailed in FIG. 3 (and can comprise any and/or all of the steps shown on FIG. 3 and described above) with respect to the creation of a billing statement image, including analysis of white space, filtering of promotional messages, selection of a promotional message, resizing/customizing of promotional messages, image conversion, etc. Those skilled in the art will appreciate, as well, that, depending on the embodiment of the invention, many of the features described herein with respect to customized promotional billing statements can be utilized in connection with customized advertising inserts, and vice-versa.

In a particular aspect, a customized advertising insert can be associated and/or share information with a particular billing statement (including, but not limited to, promotional billing statements produced in accordance with embodiments of the invention). Thus, a customized advertising insert image (e.g., as illustrated on FIG. 1B) can include billing information for a particular customer, as well as information about the provider and the like. At block 508, the customized advertising insert image can be correlated with a promotional theme used by associated billing statements and/or advertising inserts. In certain embodiments, correlating an advertising insert with a promotional theme can include ensuring that the provider's logo and/or other provider information remains consistent from the billing statement to the customized advertising inserts. Correlation can also comprise inclusion of certain billing and/or other (e.g., demographic) information from the billing statement on the customized advertising insert image. In other cases, the promotional theme of a billing statement might involve the substance of the promotional messages on that billing statement. For instance, the billing statement 100 of FIG. 1A has a promotional theme related to DSL service, and the customized advertising insert image 50 of FIG. 1B maintains that promotional theme as well. In this way, the promotional theme may include certain selection criteria and, correlation of promotional theme between an advertising insert and a billing statement can include applying the selection criteria that were used on the billing statement to the advertising insert image.

Likewise, any customization of promotional messages on the billing statement (e.g., color, font size, style modifications, etc., can be carried over to the customized advertising insert to ensure consistency between the billing statement and the advertising insert. In another sense, however, the correlation might be cohesive. For instance, if the promotional theme of a billing statement is DSL service, different advertising inserts might each be directed toward similar, but not identical, service offerings; thus, a particular advertising insert might include different ads for other telecommunication services, while a second advertising insert might include promotional messages related to certain hardware necessary to use DSL service. Based on the disclosure herein, therefore, those skilled in the art will recognize that there are a wide variety of options involved in correlating promotional themes and the use of particular methods of correlation can be considered discretionary.

At block 512, the projected weight of the customized advertising insert image can be calculated. In one aspect, software running on server 208 can be programmed with instructions to analyze the number of pages on a particular billing statement, along with any associated advertising inserts, and multiply those pages by one or more multipliers to establish the weight of the overall mailing. For instance, if the billing statement pages are on 8½ by 14 inch paper, they can be assigned a certain weight per page while if the customized advertising inserts are on 8½ by 11 inch paper, they can be assigned a different weight per page. Software on server 208 can compile a composite weight, based on the weight of each page multiplied by the number of pages.

This information can be stored and/or, at block 516, compared to a predetermined threshold. One example of a predetermined threshold can be the published rates for the U.S. Postal Service and/or any other delivery services. In this way, for instance, if the Postal Service has a particular weight threshold at which it begins charging a higher rate of postage, the application can compile the weight of the billing statement, any currently associated advertising inserts and any necessary mailing materials such as envelopes and the like. If this weight is less than the Postal Service's threshold, the application can continue to add customized advertising inserts until it reaches the Postal Service threshold or an arbitrary threshold has been met. Arbitrary thresholds can include business rules that specify, for example, that no more than three customized advertising inserts should be associated with any particular billing statement, perhaps in order to avoid deluging customers with advertising inserts. Those skilled in the art will recognize that other arbitrary thresholds may be established as well. For instance, an arbitrary threshold may be set at a certain point below the Postal Service threshold in order to provide buffer space, so that a given mailing does not run too close to the Postal Service threshold and risk incurring additional postage.

At block 520, any prepared advertising insert images can be transmitted to the printer, and at block 524 the images can be output by the printer as advertising inserts. At block 528, customized advertising inserts can be associated with one another and or with a particular billing statement. Such association can, but need not necessarily, involve the use of a collating device (e.g., 236). In accordance with certain embodiments, associating an advertising insert with a billing statement and/or another advertising insert can involve sorting, grouping and/or identifying one or more statement and/or insert pages using a common identifier. For instance, referring back again to FIGS. 1A and 1B, identifiers 148, 172 can be scanned and/or otherwise detected by a sensor on collating device 236, and if identifiers 148, 172 are identical or otherwise associated with one another (i.e., they comprise a "common" identifier), collating device can sort/collate billing statement 100 and advertising insert 150 together. Those skilled in the art will recognize, based on the disclosure herein, that while for case of description, exemplary statement 100 and exemplary insert 150 each comprise one page, certain embodiments of the invention allow for multi-page statements and/or inserts. In such embodiments, each page of a statement/insert can comprise an identifier, as discussed above, and the identifiers can be used to associate the pages with one another, perhaps in a similar fashion as described above with respect to associating a statement with an insert.

In this way, embodiments in the invention provide novel systems and methods for producing customized billing statements and/or advertising inserts, as well as systems and methods for associating different pages of billing statements and advertising inserts with one another. The description above identifies certain exemplary embodiments for implementing the invention, but those skilled in the art will recognize that many modifications and variations are possible within the scope of the invention. Therefore, the invention is defined only by the claims set forth below.

What is claimed is:

1. A system for producing a customized advertising insert for a particular billing statement associated with a particular customer, the system comprising:
   an industrial printer adapted to produce at least one customized advertising insert from at least one customized advertising insert image;
   a collating device configured to receive the at least one customized advertising insert from the industrial printer and associate the at least one customized advertising insert with the particular billing statement, wherein the at least one customized advertising insert and the particular billing statement each comprise a common identifier;
   a database adapted to store a plurality of customized promotional messages;
   at least one processor in communication with the industrial printer and the database; and
   at least one computer readable medium in communication with the processor, wherein the computer readable medium comprises instructions executable by the processor to select at least one of the plurality of customizable promotional messages, to create the at least one customized advertising insert image, wherein the at least one customized advertising insert image further comprises at least one of the plurality of customizable promotional messages, and to transmit the at least one customized advertising insert image to the industrial printer;
   wherein the at least one computer readable medium comprises further instructions executable by the at least one processor to:
      calculate a projected weight of the at least one customized advertising insert;
      compare the calculated projected weight of the at least one customized advertising insert with a predetermined weight threshold;
      if the projected weight of the at least one customized advertising insert is less than the predetermined threshold, create at least one additional customized advertising insert image; and
   wherein the at least one additional customized advertising insert image comprises the common identifier and at least one additional customizable promotional message.

2. The system of claim 1, wherein the at least one customized advertising insert image is a plurality of customized advertising insert images, and wherein each of the plurality of customized advertising insert images comprise the common identifier.

3. The system of claim 1, wherein the common identifier is a bar code.

4. The system of claim 1, wherein the at least one processor is incorporated within a computer in communication with the industrial printer.

5. The system of claim 1, wherein the at least one processor is a plurality of processors comprising a first processor and a second processor.

6. The system of claim 5, wherein the at least one computer readable medium is a plurality of computer readable media, the plurality of computer readable media comprising:
   a first computer readable medium in communication with the first processor; and
   a second computer readable medium in communication with the second processor.

7. The system of claim 1, wherein the at least one computer readable medium comprises further instructions executable by the at least one processor to divide the at least one customized advertising insert image into a plurality of panels, wherein at least one of the plurality of panels comprises at least one of the plurality of customizable promotional messages.

8. The system of claim 1, wherein the at least one computer readable medium comprises further instructions executable by the at least one processor to correlate the at least one customized advertising insert image with a promotional theme associated with the particular billing statement.

9. The system of claim 1, wherein the at least one customized advertising insert image comprises customer billing information for the particular customer, and wherein the customer billing information is associated with the billing statement.

10. The system of claim 1, wherein the at least one customized advertising insert and the at least one additional customized advertising insert image share a common promotional theme.

11. The system of claim 1, wherein the database further comprises demographic information about the particular customer.

12. The system of claim 11, wherein the at least one computer readable medium comprises further instructions executable by the at least one processor to customize the at least one customizable promotional message based upon the demographic information for the particular customer.

13. The system of claim 11, wherein the database further comprises a plurality of selection criteria for determining which of the plurality of customizable promotional messages should be included on the at least one customized advertising insert image.

14. The system of claim 13, wherein the at least one computer readable medium comprises further instructions executable by the at least one processor to filter the plurality of customizable promotional messages with at least one of the plurality of selection criteria prior to selecting the at least one customizable promotional message.

15. The system of claim 14, wherein filtering the plurality of customizable promotional messages comprises applying the selection criteria to the demographic information for the particular customer, in order to determine a set of appropriate customizable promotional messages for that customer.

16. A method for producing a customized advertising insert for a particular billing statement associated with a particular customer and comprising a common identifier, the method comprising:
   one or more computers storing, in a database, a plurality of customizable promotional messages;
   at least one of the one or more computers selecting at least one of the plurality of customizable promotional messages;
   at least one of the one or more computers creating at least one customized advertising insert image, wherein the at least one customized advertising insert image includes the common identifier and the at least one customizable promotional message;
   at least one of the one or more computers calculating a projected weight of the at least one customized advertising insert;
   at least one of the one or more computers comparing the calculated projected weight of the at least one customized advertising insert with a predetermined weight threshold; and
   if the calculated projected weight of the at least one customized advertising insert is less than the predetermined threshold, at least one of the one or more computers creating at least one additional advertising insert image, wherein the at least one additional advertising insert image comprises the common identifier and at least one additional customizable promotional message;
   at least one of the one or more computers transmitting the at least one customized advertising insert image to an industrial printer;
   the industrial printer producing at least one customized advertising insert from the customized advertising insert image;
   a collating device associating the at least one customized advertising insert with the particular billing statement, wherein the particular billing statement also comprises the common identifier.

17. The method of claim 16, wherein the at least one customized advertising insert image is a plurality of customized advertising insert images, and wherein each of the plurality of customized advertising insert images includes the same common identifier.

18. The method of claim 16, wherein selecting at least one of the plurality of customizable promotional messages comprises analyzing the at least one customized advertising insert image to determine at least one dimension of an available white space and selecting a promotional message that is dimensionally appropriate for the available white space.

19. The method of claim 16, further comprising:
   storing in the database demographic information about each of a plurality of customers, wherein the plurality of customers comprises the particular customer.

20. The method of claim 19, further comprising:
   customizing the at least one customizable promotional message based on the demographic information for the particular customer.

21. The method of claim 19, wherein the method further comprises storing in the database a plurality of selection criteria for determining which of the plurality of customizable promotional messages should be included on the at least one customized advertising insert image, and wherein selecting at least one of the plurality of customizable promotional messages comprises filtering the plurality of customizable messages with at least one of the selection criteria.

22. The method of claim 21, wherein filtering the plurality of customizable promotional messages comprises applying the selection criteria to the demographic information for the particular customer, in order to determine a set of appropriate customizable promotional messages for that customer.

23. The method of claim 16, wherein the predetermined weight threshold depends upon the weight of the billing statement.

24. The method of claim 16, further comprising:
   correlating the at least one customized advertising insert image with a promotional theme associated with the particular billing statement.

25. The system of claim 1, wherein the collating device being configured to associate the at least one customized advertising insert with the particular billing statement comprises the collating device determining that the common identifier of the at least one customized advertising insert is associated with the common identifier of the particular billing statement.

* * * * *